Figure 5:
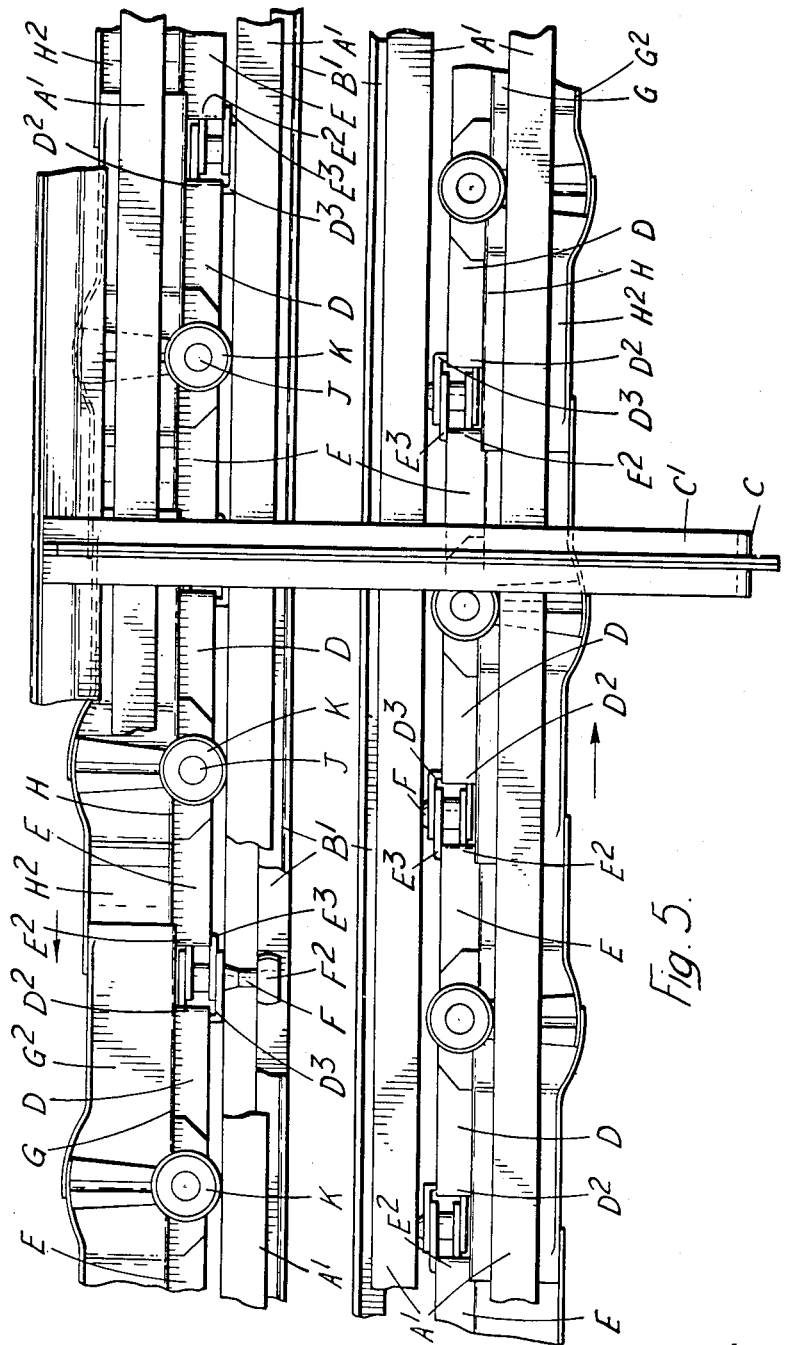

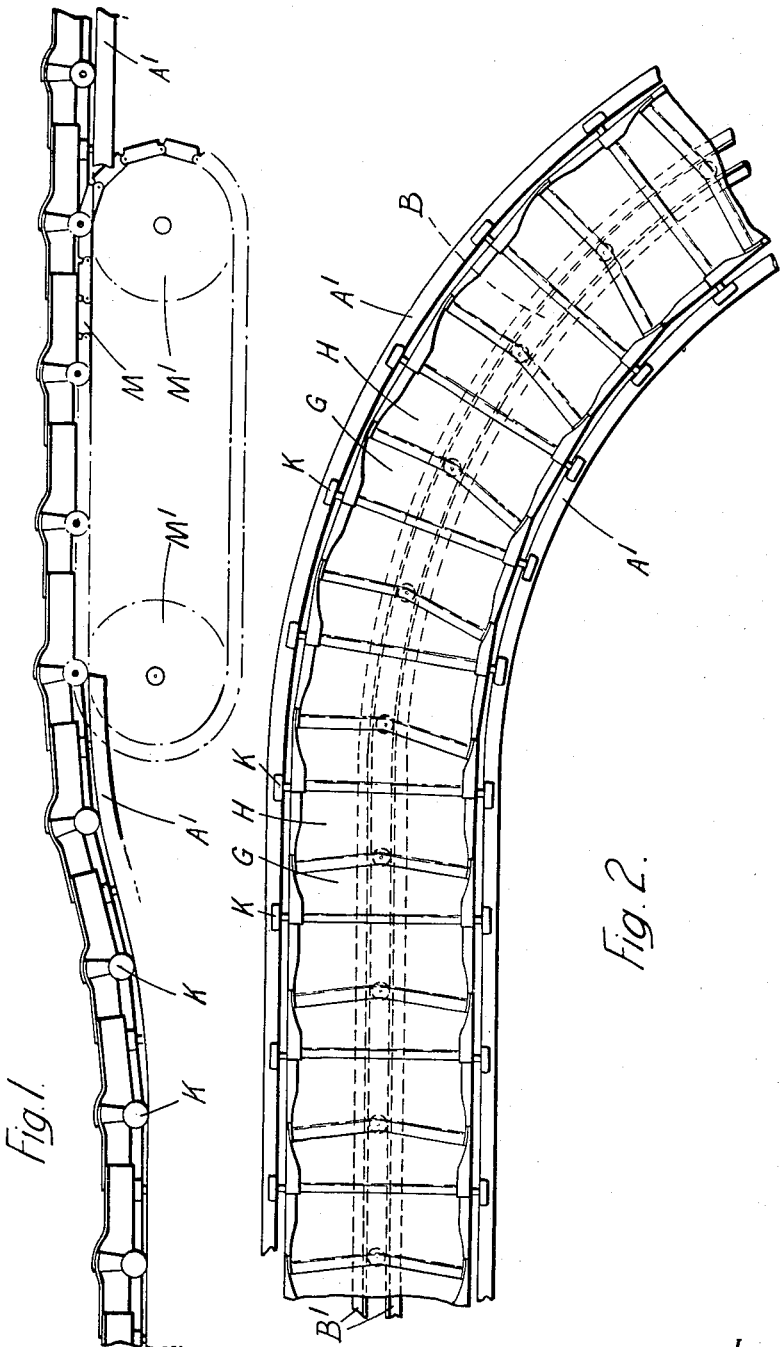

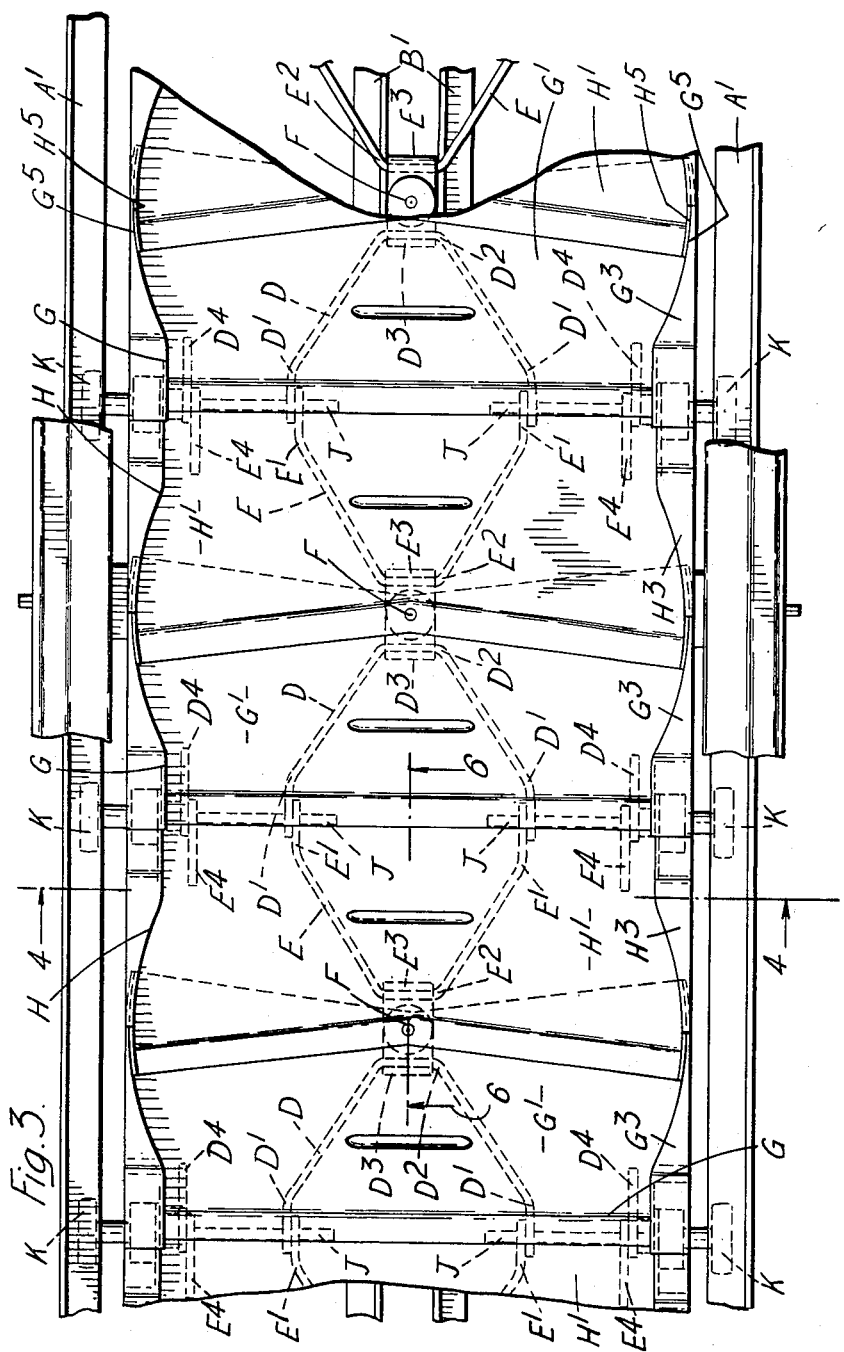

July 10, 1956　　　　　A. G. BLOOMER　　　　2,753,983
ENDLESS CONVEYOR
Filed Feb. 24, 1955　　　　　　　　　　　　　　5 Sheets-Sheet 3
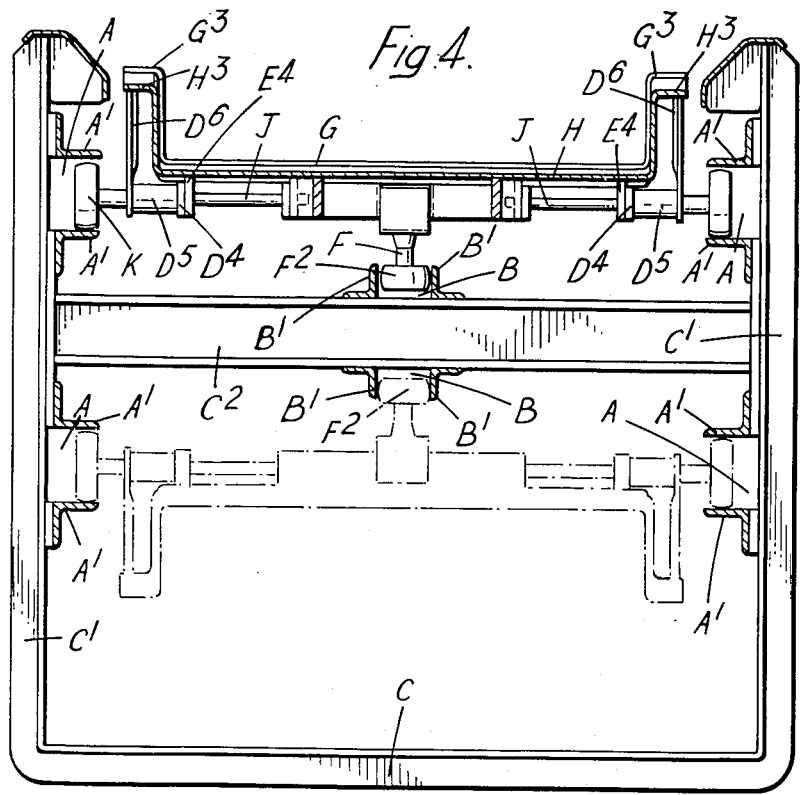
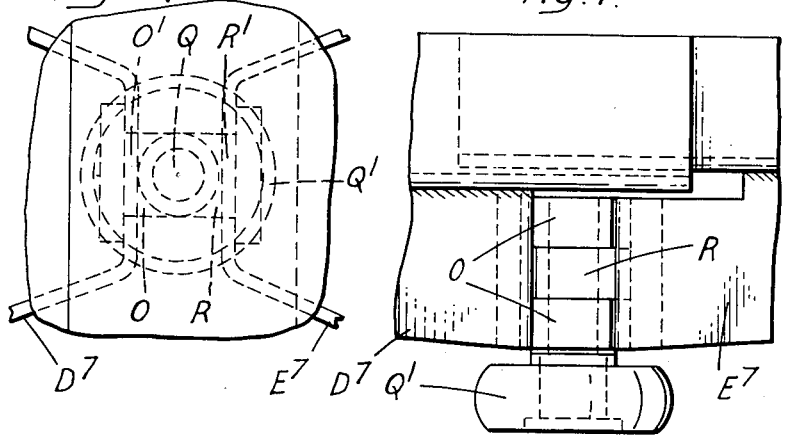
Inventor
Alfred G. Bloomer
By Watson, Cole,
Grindle & Watson
Attorneys July 10, 1956  A. G. BLOOMER  2,753,983
ENDLESS CONVEYOR
Filed Feb. 24, 1955  5 Sheets-Sheet 4

Inventor
Alfred G. Bloomer
By Watson, Cole,
Grindle & Watson
Attorneys

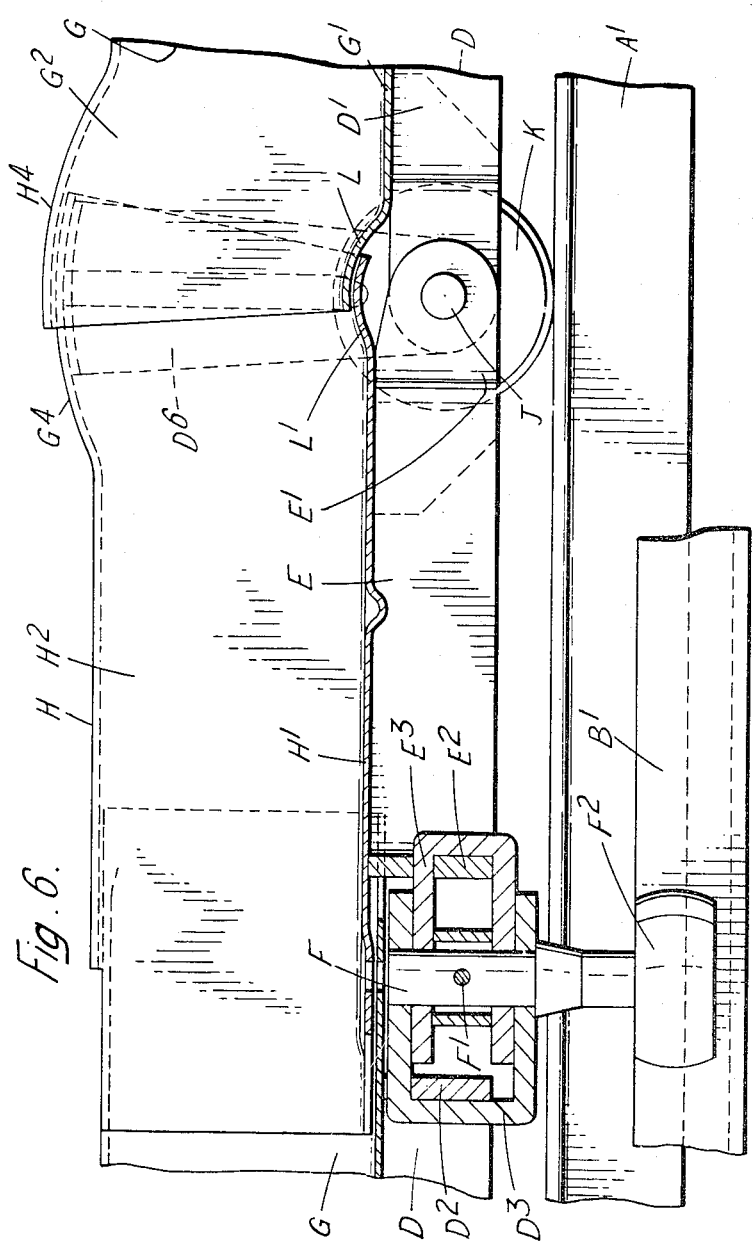

United States Patent Office 2,753,983
Patented July 10, 1956

2,753,983
ENDLESS CONVEYOR

Alfred George Bloomer, Nottingham, England, assignor to G. R. Turner Limited, Nottingham, England, a British company Application February 24, 1955, Serial No. 490,333

2 Claims. (Cl. 198—196)

This invention relates to endless conveyors capable of passing round curves in horizontal as well as in vertical planes so as to be capable of conveying material or products both vertically and horizontally as may be required, and of the kind comprising an endless chain of elements (hereinafter called link elements), each of which is pivoted to one of its neighbours about a horizontal axis and to its other neighbour about a vertical axis, with suitable supporting wheels mounted to rotate about the horizontal axes, and guide rollers mounted to rotate about the vertical axis, the wheels and rollers engaging appropriate supporting or guiding tracks.

It is an object of the present invention to provide an improved conveyor of the above kind which will be suitable for transporting a large variety of kinds of materials and products, especially when the materials or products are in the form of lumps, grains, powder or in like form such for example as coal, or in the form of small manufactured or partly manufactured products or are contained in bulky containers.

Endless conveying apparatus according to the present invention comprises a series of link elements arranged to form a chain of elements, each link element being connected to one of its neighbours by a vertical pivotal connection and to its other neighbour by a horizontal pivotal connection having its axis at right angles to the length of the conveyor, supporting wheels disposed coaxially with the horizontal pivoted connections and guide wheels arranged coaxially with the vertical pivotal connections, and each link element being of substantial width and having rigidly supported therefrom load-carrying means.

In a convenient arrangement the horizontal pivotal connections include pivot pins which serve not only to connect the adjacent ends of the link elements pivotally to one another but also as axles supporting the supporting wheels. Similarly it may be convenient for the vertical pivotal connections to include pivot pins which not only connect the adjacent ends of the link elements pivotally to one another but also carry on their lower ends the guide wheels.

In some cases each vertical pivotal connection may have associated with it a pivotal joint such as to permit relative pivotal movement between the two adjacent link elements about an axis parallel to the length of the conveyor to allow the conveyor to negotiate a spiral or like curve.

In one particularly useful form of conveyor according to the present invention the load carrying means comprises a series of tray-like load carrying members each supported from its associated link element, these load-carrying members being arranged to form a substantially continuous trough and including means at the adjacent ends of the load carrying members which, while permitting the required relative pivotal movement between the adjacent link elements, substantially prevents escape or leakage of material or articles supported by the load-carrying means between the adjacent load carrying members.

Thus in one convenient arrangement the load carrying members are formed so as to overlap so as to form a substantially continuous trough, one or each of the overlapping parts of each pair of adjacent load carrying members being of circular cross section in planes normal to the axis of the adjacent pivotal connection between the link elements which support such load carrying members. In one such construction each load carrying member may be of rectangular cross section in vertical planes normal to the length of the conveyor with at least one of the two side portions of each pair of load carrying members which overlap adjacent to a vertical pivotal connection formed part cylindrical about the axis of that pivotal connection while at least one of the two base portions of each pair of load carrying members which overlap adjacent to a horizontal pivotal connection is formed part cylindrical about the axis of such horizontal pivotal connection.

One construction of conveying apparatus according to the invention is shown somewhat diagrammatically by way of example in the accompanying drawings, in which:

Figure 1 is a diagrammatic side elevation of a part of the conveying apparatus on a small scale, Figure 2 is a diagrammatic plan view of part of the conveying apparatus including a curve in a horizontal plane, Figure 3 is a plan view on an enlarged scale of a short section of the conveying apparatus, with part of the supporting structure broken away, Figure 4 is a cross section on the line 4—4 of Figure 3, Figure 5 is a side elevation of the section of the conveying apparatus shown in Figures 3 and 4, Figure 6 is a side elevation on a still larger scale of a short section of the conveying apparatus, with a part shown in cross section, Figure 7 is a side elevation on an enlarged scale showing a modified form of vertical pivotal connection which in some circumstances may be used, and Figure 8 is a plane view of the construction shown in Figure 7.

The conveying apparatus shown in Figures 1 to 6 comprises a pair of parallel spaced supporting tracks A in the form of channels formed by a pair of L section members $A^1$, with the open sides of the channels facing one another, and a central guide track B also in the form of a channel formed by a pair of L section members $B^1$ and with its open side facing either upwards or downwards according to whether the associated part of the endless conveyor is above or below it, the supporting and guide tracks being carried by a supporting structure comprising a series of U-shaped supporting members generally indicated at C having side members $C^1$ which carry the supporting tracks A and transverse members $C^2$ which carry the guide tracks B.

The endless conveyor itself comprises a series of link members D, E which are approximately U-shaped in plan as shown in Figure 3 and are arranged with each end of each link member lying adjacent to the corresponding end of the adjacent link member, that is to say the end $D^1$ or $E^1$ of each link member which is formed by the arms of the U lies adjacent to the arms $E^1$ or $D^1$ of the U constituting the adjacent link member while the end $D^2$ or $E^2$ constituted by the centre of the U lies adjacent to the centre $E^1$ or $D^2$ of the U constituting the adjacent link member.

The adjacent ends $D^2$ and $E^2$ of any pair of link members are rigidly connected to socket members $D^3$, $E^3$ through the bores of which pass a pivot pin F so as to form a vertical pivotal connection between such ends of the link members. Each pivot pin F is held in place by a transverse pin $F^1$ and carries at its lower end a guide wheel $F^2$.

Secured to the upper sides of the link members D and E as by welding are load carrying members G, H of generally rectangular cross section in vertical planes normal to the length of the conveyor as shown in Figure 4 and comprising horizontal base portion $G^1$, $H^1$ and vertical side portions $G^2$, $H^2$.

The adjacent ends of the load carrying members G and H overlap in a manner hereinafter more fully described and the sides adjacent to the ends $D^1$, $E^1$ of the link members are provided with laterally projecting flanges $G^3$, $H^3$. Secured as by welding to the base portions of the load carrying members G and H adjacent to the ends $D^1$ and $E^1$ of the link members are brackets $D^4$, $E^4$ each bracket $D^4$ being rigidly secured to one end of a socket $D^5$ the other end of which is connected by a web $D^6$ to the underside of the adjacent flange $H^3$. Passing through the bores of the sockets $D^5$ and through bores in the brackets $D^4$ and $E^4$ and the ends of the arms $D^1$ of the link members D are pivot pins J on the outer ends of which are mounted supporting rollers K which engage the supporting tracks A as shown.

The base portions of the load carrying members G and H which overlap adjacent to each pivotal connection including the pivot pins K are formed part cylindrical as shown at L, $L^1$ in Figure 6, the axes of the cylinders being coincident with that of the pivotal connection while the adjacent overlapping side portions are flat but, as also shown in Figure 6 have arcuate upper edge portions $G^4$, $H^4$ the parts of the flanges $G^3$, $H^3$ on which are of part cylindrical form as shown in Figures 1 and 5.

The base portions of the ends of the load carrying members G and H which overlap adjacent to the ends $D^2$ and $E^2$ of the link members are formed flat as shown in Figure 6 while the overlapping side portions are part cylindrical as shown at $G^5$, $H^5$ with the axes of the cylinders coincident with that of the pivot pin F.

It will thus be apparent that the load carrying members together form a substantially continuous trough so formed as to allow for the relative pivotal movement between the link members. It will also be seen that the load carrying members form in effect a unit with the link members and that the structure may in fact be regarded as comprising a series of combined link and load-carrying members.

The construction as described above allows for the travel of the conveyor around horizontal curves as indicated for example in Figure 2 during which travel it will be apparent that the conveyor is guided mainly by the central guide wheels $F^2$, or round curves in vertical planes as indicated briefly in part of Figure 1.

The conveyor may be driven in a variety of ways but in a convenient arrangement may be driven in a manner generally known per se by an endless chain as indicated at M in Figure 1 supported on two sprocket wheels $M^1$ one of which is driven, and having link or other members formed for engagement with the conveyor, for example with the combined pivot pin and axle members J.

In the modification shown in Figures 7 and 8 each vertical pivotal connection between adjacent link members $D^7$, $E^7$ instead of being as shown in Figure 6 is constituted by a pair of socket members O, R pivotally connected respectively to the adjacent ends of the two link members $D^7$, $E^7$ by pivotal connections $O^1$, $R^1$ having their axes parallel to the length of the conveyor. The two socket members are pivotally connected to one another by a vertical pin Q the lower end of which carries a guide wheel $Q^1$.

What I claim as my invention and desire to secure by Letters Patent is:

1. Endless conveying apparatus comprising a series of link elements arranged to form a chain of said elements, pivotal connections between the adjacent ends of the said link elements, the pivotal connection at one end of each link element having its pivotal axis vertical while that at the other end of the element has its pivotal axis horizontal and at right angles to the length of the chain, a pair of supporting wheels having a common axis coincident with that of each of said horizontal pivotal axes and substantially spaced from one another at opposite sides of the said chain, a guide wheel disposed with its axis coincident with each of said vertical pivotal axes, a load carrying platform rigid with each link element, supporting tracks engaged by the said supporting wheels, a guide track engaged by the said guide wheels, each load carrying platform being of rectangular trough-shaped cross-section in vertical planes normal to the length of the chain, the overlapping parts of the bases of the trough-like platforms adjacent to each pivotal connection having a horizontal axis being part cylindrical while the adjacent overlapping side portions are flat, and the overlapping parts of the bases of the troughlike platforms adjacent to each pivotal connection having a vertical pivotal axis being flat while the adjacent overlapping side portions are part cylindrical.

2. Endless conveying apparatus as claimed in claim 1 in which the upper edge of one of each pair of overlapping side portions of adjacent platforms has a laterally projecting flange which overlaps the upper edge of the other of said pair of overlapping side portions.

References Cited in the file of this patent

UNITED STATES PATENTS

| 2,187,498 | Landahl | Jan. 16, 1940 |
| 2,406,279 | Anderson | Aug. 20, 1946 |
| 2,627,339 | Whiting | Feb. 3, 1953 |

FOREIGN PATENTS

| 288,954 | Great Britain | Apr. 5, 1928 |